United States Patent [19]
Arnauts et al.

[11] Patent Number: 6,074,749
[45] Date of Patent: Jun. 13, 2000

[54] ACID DYEABLE FIBRE

[75] Inventors: Jan E. F. Arnauts, Beringen, Belgium;
Atze J. Nijenhuis, Sittard, Netherlands;
Cornelis Versluis, Stein, Netherlands;
Rene Aberson, Venlo, Netherlands

[73] Assignee: DSM N.V., Heerlen, Netherlands

[21] Appl. No.: 09/205,175

[22] Filed: Dec. 4, 1998

Related U.S. Application Data

[63] Continuation of application No. PCT/NL07/00323, Jun. 6, 1997.

[30] Foreign Application Priority Data

Jun. 6, 1996 [BE] Belgium ................................ 9600513

[51] Int. Cl.[7] .............................. D02G 3/00; C08G 69/08
[52] U.S. Cl. .......................... 428/364; 528/310; 528/323; 528/335
[58] Field of Search ..................................... 528/310, 323, 528/335; 428/364

[56] References Cited

U.S. PATENT DOCUMENTS

| | | | |
|---|---|---|---|
| 2,904,536 | 9/1959 | Reith . | |
| 3,296,214 | 1/1967 | Pickett, Jr. | ............................ 528/329.1 |
| 3,304,289 | 2/1967 | Ballentine et al. . | |
| 3,386,967 | 6/1968 | Twilley | ..................................... 528/323 |
| 3,890,286 | 6/1975 | Bingham et al. . | |
| 4,061,621 | 12/1977 | Lofquist et al. . | |
| 4,075,271 | 2/1978 | Lofquist et al. . | |
| 5,149,758 | 9/1992 | Matthies . | |
| 5,851,238 | 12/1998 | Gadoury et al. | ............................ 8/442 |

FOREIGN PATENT DOCUMENTS

| | | |
|---|---|---|
| 0462476 A1 | 12/1991 | European Pat. Off. . |
| 0682057 A1 | 11/1995 | European Pat. Off. . |
| WO 93/25736 | 12/1993 | WIPO . |

*Primary Examiner*—Samuel A. Acquah
*Attorney, Agent, or Firm*—Pillsbury Madison & Sutro LLP

[57] ABSTRACT

The invention relates to an acid-dyeable polyamide fiber which can be obtained very reproducibly and unsusceptibly to faults during the production process. The fiber is characterized in that the amino end group content is less than 10 meq/kg. A very reproducible affinity for dyestuffs is obtained by copolymerization of a compound containing an acidic end group and having a basic nature. Compounds derived from melamine are particularly suitable.

8 Claims, No Drawings

ACID DYEABLE FIBRE

This application is a continuation of PCT/NL07/00323, filed Jun. 6, 1997.

The invention relates to an acid-dyeable polyamide fibre. The acid dyeing of polyamide fibres takes place by ion exchange in aqueous medium. For this purpose, the dye is dissolved in an aqueous medium and attached to the fibre by means of ion exchange. In the case of acidic dyestuffs, which form by far the greater part of the dyestuffs used for polyamide fibres, the amino end groups of the polyamide chains serve as ion-exchange sites in this process. In order to obtain sufficient colour intensity, the concentration of amino end groups in the polyamide should be in the order of at least 20 meq/kg, see for instance EP-A-0,462,476.

The end group concentration in a polyamide fibre is determined by various conditions and imposes very high demands on the reproducibility of the production process of the polyamide and of the fibre. Interferences during the production process of the polyamide and its spinning to form fibre have a great influence on the end group content. As a result, it is difficult to achieve very reproducible colours which are demanded by the consumer.

The subject of the invention is a polyamide fibre whose affinity for dyestuffs is not influenced or influenced only to a small extent by the production process for the polyamide and the spinning to form fibre. A further subject of the invention is a polyamide fibre having a high thermal and light stability.

The inventors have succeeded in producing such a fibre by starting from a polyamide having a very low amino end group content, i.e. less than 10 meq/kg, preferably less than 5 meq/kg, still more preferably less than 3 meq/kg. The greatest preference is given to a polyamide in which the amino end groups are virtually completely absent.

Such polyamides having a very low amino end group content are obtainable by using, in the polymerization process for the preparation of the polyamide, a quantity of a monofunctional, difunctional, trifunctional or more highly functional acid as chain stopper or chain extender, which quantity is such that the amino end groups have been removed by reaction with the acid at the desired degree of polymerization.

Polyamides having a very low amino end group content are known from for instance U.S. Pat. No. 3,386,967.

If no additional measures are taken, the fibre obtained from such a polyamide will not be acid-dyeable or will be acid-dyeable only to a very limited extent as a result of the virtual absence of amino end groups.

The inventors have overcome this in that, in each polyamide chain in the case of polyamide chains containing units derived from a diamine and a dicarboxylic acid, at least one unit derived from a dibasic acid having the formula —Z—X—Z—, preferably a dicarboxylic acid having the formula

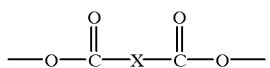

is present in the chain, or the chain is terminated by at least one unit having the formula

—Z—X—Y, preferably

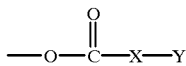

and, in the case of polyamides containing units derived from an α,ω-aminocaproic acid or obtainable by ring-opening polymerization of lactams, at least one unit Y—X(—Z—)$_n$ preferably

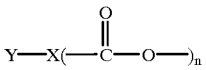

is present, where Y=H or ZH, preferably COOH, X=an organic radical having a basic nature, n=1–20 and Z=an acid radical, preferably of a sulphonic acid or carboxylic acid.

By a basic nature is meant that the organic radical reacts as a base against an acidic dye.

Such polyamides can be obtained conventionally by copolymerization of the respective acids with the monomers for the polyamide under the conditions for the polycondensation of diamines and dicarboxylic acids to form polyamides of the AABB type and polycondensation of α,ω-amino acids or ring-opening polymerization of lactams to form polyamides of the AB type. Preferably, the polyamides are subjected in this process to a postcondensation in the solid phase.

It is known from U.S. Pat. No. 3,296,214 to improve dyeability of polyamides by copolymerising a viscosity stabilizer consisting of piperidine-N-acetic acid. However the polyamides disclosed in this reference do not contain less than 10 meq amine end groups/kg, nor is any indication given of the advantageous effects of lowering the amino end group content with respect to the improved inertness against deviations in the production process of the polyamide, the fibre thereof and the dyeing of the fibre.

Organic radicals having a basic nature are, inter alia, radicals of compounds which contain nitrogen or oxygen or both nitrogen and oxygen. Suitable compounds are, for example, heterocyclic compounds, preferably with nitrogen in the ring. Examples of such nitrogen-containing heterocyclic compounds are pyridine, piperidine, quinoline, quinoxaline, acridine, indole, phenanthridine, 1,4-diazines, for example 1,4-piperazine, 1,3,5-triazines, for example melamine and melam, furan and proline, which have been substituted, if desired. Of these compounds, melamine is strongly preferred. Particular advantage is offered by 1,3,5-triazine-2,4,6-trisaminocarboxylic acid in a polyamide of the AB type. In this case, the amino acid preferably corresponds to the aminocarboxylic acid from which the units of the polyamide chains have been derived. Such polyamides, which have a degree of branching of at least 3, are exceptionally suitable for high spinning speeds.

For polyamides of the AABB type, use of monocarboxylic or dicarboxylic acids derived from nitrogen-containing heterocyclic compounds is advantageous. Examples of these are picolinic acid, nicotinic acid, piperidine dicarboxylic acids, 2- or 4-piperidine carboxylic acid, acridine carboxylic acids, for example 9-acridine carboxylic acid and 4,9-acridine dicarboxylic acid, quinoline carboxylic acid, in particular 2-, 4- or 8-quinoline carboxylic acid and quinoxaline carboxylic acid. Such acids are available commercially. Preferred are dicarboxylic acids, with which polyamides are obtained which lend themselves better to spinning the fibres according to the invention at high speed.

Other nitrogen-containing carboxylic acids suitable for copolymerization are compounds containing secondary and tertiary amines having the formula

(I)

in which R=H, alkyl or aryl. In this formula, n=1–6 preferably n=1–3, most preferably n=2:

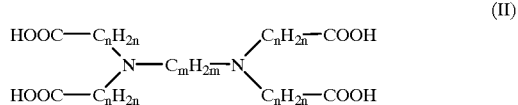

(II)

in which m=2–10, preferably 3–6, and n preferably=1–3, most preferably n=2. Instead of being substituted by 4 carboxylic acid groups, the diamine may also be substituted by 2 or 3 groups. Carboxylic acids derived from melamine by substitution of 1–6 carboxylic acid groups at the amine groups are, for example,

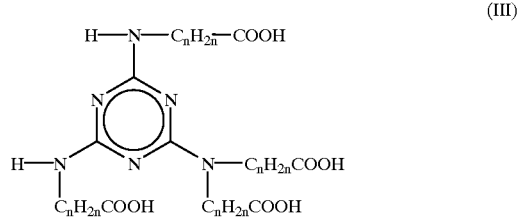

(III)

n=1–20

The above carboxylic acids are generally easy to obtain by addition of a nitrile, for example, acrylonitrile to the amine, followed by hydrolysis to form carboxylic acid.

Other amine-substituted heterocyclic and aromatic compounds in which one or two aliphatic carboxylic acids are substituted at the amine are, for example,

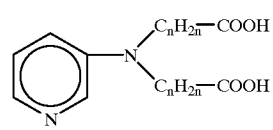

(IV)

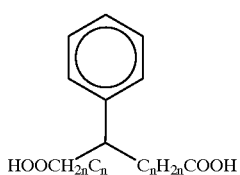

(V)

However these amine-substituted compounds in which the substituted N is the only center that can be protonated in the acid dyeing process are less effective, and are very sensitive to dyeing conditions as for instance pH.

The above summary is not exhaustive but only an illustration of the many possibilities for achieving the object of the invention.

A requirement of the acids used as comonomer is that they are at least stable under the conditions of the polymerization and the processing to form fibre. In some cases, for example nicotinic acid, which is unstable under the conditions of the polymerization, the stability can be improved by first producing, at lower temperature, an oligomer by reaction with, for example, aminocaproic acid, which is then used in the ring-opening polymerization of caprolactam to form polyamide-6 at higher temperature.

From WO-93/25736 it is known that high-speed spun polyamide-6 fibres having good properties can be obtained if the caprolactam is polymerized in the presence of a dicarboxylic acid chosen from a specific group of dicarboxylic acids or specific diamines. The content of chemically bound dicarboxylic acid for the extracted and dried final product is between 5 and 60 mmol/kg, preferably between 10 and 50 mmol/kg. Should the affinity for dyestuffs be inadequate, a specific diamine can, if desired, be added (page 6, lines 17–21). If, on the other hand, the melt stability is inadequate, it is advisable to use, in addition to the dicarboxylic acid, a primary amine as chain regulator.

It will be clear for the person skilled in the art that this method of polymer production is very sensitive to variations and reproducibility is doubtfull.

As will be evident from the experiments, in the case of the fibre according to the invention, no change in the solution viscosity occurs during the spinning, as a result of which there is no change in the end group content, and the melt viscosity is equally little subject to alteration if the polyamide is kept in the melt for a fairly long time. All this implies that the polymer is extremely stable and that the affinity for dyestuffs is not influenced by the spinning process and that the spinning process itself is also less susceptible to faults and short interruptions in the spinning process and for instance the failure of one or more spinning heads in a production line has no influence on the properties of the fibre, such as, for example, the affinity for dyestuffs.

The invention is now explained by reference to the following examples and comparative examples.

MATERIALS

Akulon VMT 1203® supplied by DSM, The Netherlands, nylon-6 with benzoic acid as chain stopper, $\eta_{rel}$=2.81, for carpet fibre. End group content —$NH_2$=47 meq/kg, COOH= 49 meq/kg. Stabilized with Mn-acetate (15 ppm). A second charge of VMT 1203 used for the high speed spinning experiments had an end group content of —$NH_2$= 45 and —COOH=50 meq/kg.

Polyamide (1):

A polyamide-6 was prepared by polymerizing ε-caprolactam in the presence of 2,4,6-trisaminocaproic acid-1,3,5-triazine under the standard conditions for the hydrolytic preparation of aliphatic polyamide-6. For this purpose, 3.50 kg of ε-caprolactam, 35.0 g of ε-aminocaproic acid, 70.0 g of water and 58.7 g of trisaminocaproic acid triazine were added together to a 5 l reactor. The temperature was then brought to 275° C. in approximately 2 hours and kept there for 8 hours. The temperature was then brought back to 245° C. in 1 hour and kept there for 2 hours. During the heating up and the first two hours at 275° C., the system was closed, then the pressure was let down to atmospheric and water was distilled off while a nitrogen blanket was applied. After that, the reactor contents were drained off under nitrogen by applying an overpressure. The polymer strand flowing out of the reactor was cooled in ice-water and chopped up into granules which were washed with water at 100° C. and then dried. The yield of a number of batches was combined and postcondensed for 10 hours at 190° C. under a vacuum with a nitrogen leak.

No $NH_2$ end groups were found by the usual potentiometric titration in the polyamide-6 obtained. The relative viscosity, $\eta_{rel}$, was 2.69.

Polyamide (2):

A subsequent polyamide-6 was synthesized in the same way as polyamide 1, with the exception of the postcondensation. However 0.27% by weight of adipic acid was added instead of 2,4,6-triaminocaproic acid 1,3,5-triazine. The polyamide-6 obtained, which had a relative viscosity of $\eta_{rel}=2.78$, contained 27 meq of $NH_2$ end groups per kg (in conformity with Example 5b in WO 93/25736).

Spinning tests:

From the respective polyamides, fibres were spun with a Fourne spinning test apparatus at 240° C. and a winding speed of 550 m/min. The yarn titre was 70/10 dtex. The said yarn was stretched with a total stretch ratio of about 3.75. After stretching, the relative viscosity, and also the amino end group content of the polyamide-6 was determined in the fibres.

Affinity for dyestuffs:

The affinity for acidic dyestuffs of the various fibres was determined using Tectilon® G-01 Blue 200% supplied by Ciba-Geigy according to the advice by the manufacturer in his brochure entitled "Acid dyes, product information of Tectilon". The dyeing conditions are reported briefly in the table below.

TABLE I

| Temperature profile | 12 min 20° C. |
| --- | --- |
| | 70 min linear temperature increase to 100° C. |
| | 35 min 100° C. |
| Additives | 0.5 g/l Albegal ® |
| | 0.5% Univadine PA ® |
| | 1.5% ammonium acetate/acetic acid to pH = 5 to 5.5 |
| | 85 mg/l dyestuff |
| Liquid ratio | 600 |

After dyeing, the yarns were carefully cleaned with cold water. The dyestuff content of the fibres was determined by dissolving the fibres in concentrated formic acid and determining the light absorption of this solution using a spectrophotometer. In this determination, the absorption value was kept between 0.2 and 1.2 by adequate dilution. Any titanium oxide present was filtered off.

MELT VISCOSITY

The melt viscosity was determined using DMA (dynamic mechanical analysis) going from high to low frequency using a Rheometrics 800 apparatus at 240° C. $\eta_o$ was determined by extrapolation to the frequency zero.

EXAMPLES AND COMPARATIVE EXAMPLES

Fibres were spun from the various polyamides under the conditions specified above and cold-stretched or hot-stretched, respectively. The relative viscosity and the amino end groups content of the polyamide were determined before and after spinning. The affinity for acidic dyestuffs of the fibres was determined as specified above. The results are shown in Table II.

TABLE II

| | $n_{rel}$ | | $[NH_2]$ meq/kg | | Fibre dyestuff absorption | |
| --- | --- | --- | --- | --- | --- | --- |
| | before | after | before | after | mg/g | mg/meq |
| Polyamide | spinning | | spinning | | polyamide | $NH_2$ |
| Akulon VMT 1203 | 2.82 | 2.93 | 47 | 43 | 2.60 | 0.060 |
| (1) | 2.69 | 2.69 | — | — | 2.11 | 0.054* |
| (2) | 2.68 | 2.78 | 27 | 23 | 1.43 | 0.062 |

*) mg/meq of triazine ring.

In relation to the relative viscosity, it is evident from the results that the fibre according to the invention can be spun much more reproducibly than, inter alia, the fibre from polyamide (2) which is virtually identical to the polyamide according to Example 5b of WO 93/25736 which is spun to produce fibre in Example 12. Only the polyamide in the fibre according to the invention has a relative viscosity which does not differ from that of the initial polyamide, which means that, during the spinning process, no perceptible alterations occur in the polyamide, as a result of which a very reproducible fibre is obtained, and that interferences in the spinning process will not result in altered chemical properties of the fibre. The excellent thermal stability is also apparent from the dynamic melt viscosity measurement in which the polyamide (1), showed virtually no change over a period of 10 minutes, whereas for polyamide (2) and the Akulon VMT 1203 a decrease, resp. an increase of melt viscosity was observed.

In a further spinning test fibres were spun with a Barmag MEX SW 46SD spinning apparatus at a set temperature of 270° C. and spinning speed of between 5000 and 5500 m/min. The yarn titer was between 50 and 51 Dtex. The amino end group content of the fibre obtained from Akulon VMT 1203, was about 10% less than of the polyamide granulate started with. The total number of end groups decreased from 95 to 83 meq/kg during the spinning process, indicating a significant change in degree of polymerisation and dyeability. The carboxylic acid end group content of polyamide 1, changed by about 3%. The amino end group content could not be measured. The total basisity of the polyamide remained constant at 43–44 meq/kg for the granulate and the fibre. This number agrees very well with the number calculated on the basis of the comonomer content started from in the synthesis of the branched polyamide, which is about 40 meq/kg. Also for this fibre dyeability was good.

It is also clear from the dyeing tests that the fibre according to the invention very surprisingly has an affinity for dyestuffs which is comparable to that of fibres which contain an appreciable content of amino end groups.

As a result of the great stability of the polyamide during the spinning process, said affinity for dyestuffs is very reproducible. An explanation of this could lie in the presence of the triazine ring, which, in its totality, reacts as one alkaline group with respect to the dye stuff. The quantity of dyestuff absorbed per triazine molecule is in the same order as the quantity of dyestuff absorbed per amino end group. In other words, by varying the quantity of built-in compound having an alkaline nature, the colour intensity can be varied. Since all the molecules of the compound having an alkaline nature are built in in the polyamide, precise metering and reproducibility are possible. Variations in the polymerization process or residence times in extruders or other processing apparatus have no influence on the affinity for dyestuffs.

It is very surprising that a fibre can nevertheless be spun with a branched polyamide such as polyamide 1. The mechanical properties of the fibre obtained are comparable to those of a fibre composed of a linear polyamide of the same relative viscosity. The modulus of elasticity even appears to be approximately 25% higher.

A further advantage of this fibre containing branched polyamide is that it can be obtained with an appreciably lower spinning filter pressure with the same spinning speed as a fibre composed of linear polyamide having the same relative viscosity. Spinning speed may be further increased without fibre rupture than for a comparable unbranched polyamide. Additional benefit can probably be achieved in relation to the mechanical properties by optimizing the spinning conditions.

What is claimed is:

1. Acid-dyeable polyamide fibre obtained by spinning a polyamide having an amino end group content of less than 10 meq/kg in which the polyamide having an amino end group content of less than 10 meq/kg is built up of repeating units produced by reaction between at least one diamine and at least one dicarboxylic acid (AABB) or by ring-opening polymerization of a lactam (AB) or by condensation of an amino acid (AB), characterized in that, in each polyamide chain in the case of AABB units, at least one unit derived from a dibasic acid having the formula

—Z—X—Z— is present in the polyamide chain, or the polyamide chain is terminated by at least one unit having the formula

—Z—X—Y and, in each polyamide chain in the case of AB units, at least one unit

Y—X(—Z—)$_n$ is present, where X=an organic radical having a basic nature, Y=H or ZH and n=1–20 and Z=an acid radical.

2. Polyamide fibre according to claim 1, characterized in that Z is

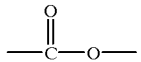

3. Polyamide fibre according to claim 1, characterized in that X is a radical of a nitrogen-containing and/or oxygen-containing organic compound.

4. Polyamide fibre according to claim 3, characterized in that X is a radical of a nitrogen-containing and/or oxygen-containing heterocyclic compound.

5. Polyamide fibre according to claim 4, characterized in that X is a radical of a nitrogen-containing heterocyclic compound.

6. Polyamide fibre according to claim 5, characterized in that the nitrogen-containing heterocyclic compound is chosen from the group comprising pyridine, piperidine, quinoline, quinoxaline, acridine, indole, phenanthridine, 1,4-diazines, 1,3,5-triazines, furan and proline, which have been substituted, if required.

7. Polyamide fibre according to claim 6, characterized in that the nitrogen-containing heterocyclic compound is melamine.

8. Polyamide fibre according to claim 6, characterized in that at least one unit per polyamide chain is chosen from the group derived from picolinic acid, pyridine dicarboxylic acids, 2- or 4-piperidine carboxylic acid, acridine carboxylic acids, 2-, 4- or 8-quinoline carboxylic acid and quinoxaline carboxylic acids.

* * * * *